Feb. 18, 1958     G. S. MILES     2,823,476
ILLUMINATED DEVICES
Original Filed April 23, 1952

INVENTOR.
GEORGE S. MILES
BY
ATTORNEY

United States Patent Office 2,823,476
Patented Feb. 18, 1958

2,823,476
ILLUMINATED DEVICES

George S. Miles, Englewood, N. J., assignor to Bendix Aviation Corporation, Teterboro, N. J., a corporation of Delaware Original application April 23, 1952, Serial No. 283,933, now Patent No. 2,772,498, dated December 4, 1956. Divided and this application April 18, 1956, Serial No. 579,078

5 Claims. (Cl. 40—130)

This application is a division of application Serial No. 283,933 filed April 23, 1952, by George S. Miles, and now U. S. Patent No. 2,772,498, granted December 4, 1956, and assigned to Bendix Aviation Corporation. The invention relates in general to illuminated devices and more particularly to devices wherein a transparent member is to be illuminated. Specifically, the present invention is directed to transparent indicia bearing members having a light filtering compensator for producing even illumination of the members and methods of producing the same.

Devices employing the "edge-lighting" or "back-lighting" methods of illuminating transparent plastics or other transparent materials, such as the faces of instrument dials and signs, have an objectionable area of relatively high brilliance near the light source which is often difficult to eliminate, especially where space is important. This is particularly true of aircraft instruments wherein a single or pair of incandescent lamps must be placed very close to the visible portion of the dial plate. In such cases, the system of illumination does not produce a precisely uniform area of light and the degree of illumination varies from point to point on the dial.

The present invention, therefore, contemplates a transparent indicia bearing member, such as a dial, wherein novel means are provided for effecting even illumination of the dial. A compensating filter such as a photographic emulsion having a variable opacity, is formed on the dial. By making the opacity of the filter proportional to the brightness of the light as it exists before passing through the filter, even illumination of the dial is obtained. A source of illumination, arranged adjacent the edge or behind the dial body, directs light rays through the filter and the dial to illuminate the indicia thereon. Where the light source is arranged adjacent the edge of the dial, the filter is formed on the face thereof whereas arrangement of the source behind the dial permits either formation of the filter on the front or on the back of the dial. In either case, the opacity of the filter is made to correspond to the brightness of the light which will pass through the filter.

In one embodiment of the present invention, the compensating filter comprises a photographic emulsion, which when developed, exhibits a variable opacity, while in a second embodiment of the invention, the filter comprises a photographic emulsion which when developed, acquires a variable thickness to exhibit a variable opacity. In the first embodiment, a white translucent layer is applied to the filter and a black mask applied thereon to outline indicia. The translucent layer diffuses the light transmitted through the filter, and also provides a background for contrast when the instrument is lighted from the front, such as by daylight. In the second embodiment, the emulsion of variable thickness forms a good background for daylight illumination, whereby the translucent layer employed in the first embodiment is not required.

An object of the present invention, therefore, is to provide novel means for evenly illuminating a transparent indicia bearing member.

Another object is to provide novel means for evenly illuminating a transparent indicating dial adapted to be illuminated by a light source arranged adjacent the dial.

A further object is to provide on a transparent member a novel compensating light filter which exhibits a variable opacity to the passage of light rays therethrough.

Still another object is to provide novel methods for producing compensating light filters for transparent members.

A further object is to provide novel methods for producing transparent indicating dials to obtain even illumination thereof.

The above and other objects and advantages of the present invention will appear more fully hereinafter from a consideration of the detailed description which follows taken together with the accompanying drawing wherein several embodiments of the invention are illustrated.

In the drawings wherein like reference characters refer to like parts throughout the several views.

Figure 1:
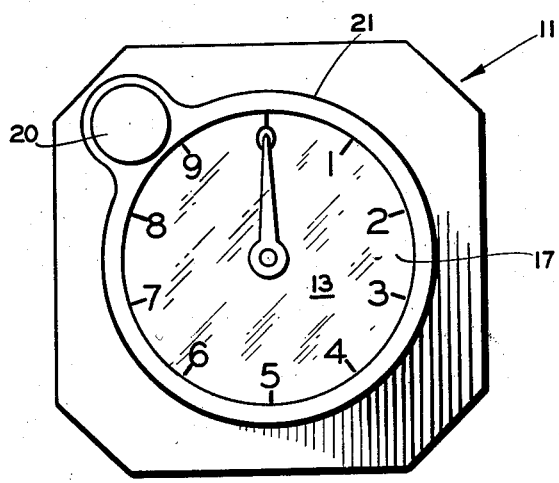
Fig. 1 is a front elevational view of an indicating instrument and illustrates one of the many applications of the present invention.

Referring now to the drawing for a more detailed description of the present invention, and more particularly to Fig. 1, an indicating instrument, generally designated by the numeral 11, is there shown to illustrate one application of the invention, the instrument having an indicating dial 13 provided with indicia 17 distributed in the usual manner about the outer portion of the dial.

Figure 2:
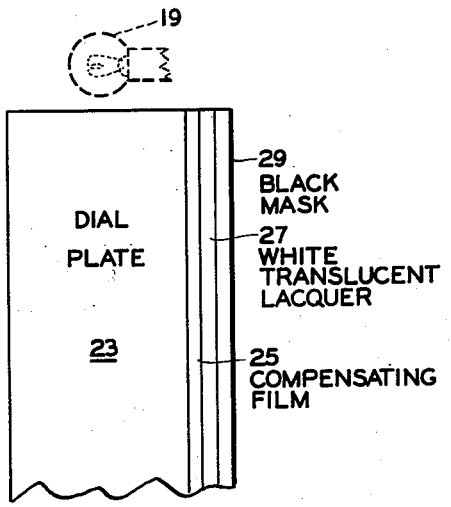
Fig. 2 is a view of a fragmentary portion of an indicating dial, similar to the dial of Fig. 1, exaggerated for purposes of clarity, and embodying the present invention.

Indicia 17 are illuminated by a source of illumination, such as a lamp 19, shown in broken lines in Fig. 2, the base 20 of the lamp being shown in Fig. 1, projecting from the instrument. A portion of the base of lamp 19 is threaded (not shown) and cooperates with a threaded portion (not shown) formed in a bezel 21 of instrument 11 whereby the lamp may be inserted from the front of the instrument. Lamp 19 is a conventional type of incandescent lamp used in instrument lighting and is connected to a suitable source of electrical energy (not shown) when inserted in the threaded portion of the bezel. The relative position of the lamp with respect to the dial is shown in Fig. 2 wherein it may be seen that light rays enter the periphery of the dial and pass through the front thereof to illuminate the latter in a manner commonly known as "edge-lighting." Only one lamp is illustrated in Fig. 1 but it is to be understood that more than one may be used, the number depending upon the particular illumination requirements of the instrument.

Indicating dial 13, in one embodiment of the invention, comprises a circular plate 23, a portion of which is shown in Fig. 2, made of colorless transparent material, such as a nacrylic resin plastic, for example. Formed on the face of plate 23 is a compensating filter 25 which comprises a film or layer of developed photographic emulsion having a variable opacity. Filter 25 presents a "resistance," so to speak, to light, which corresponds to and is proportional to the brightness value of the light immediately before it passes through the filter. Thus, filter 25 offers a greater resistance to the passage of light rays through the filter adjacent the source of illumination whereas a lesser resistance is presented at points remote from the source. The filter is darker at those points where the brightness value of light is greater so as to permit less light to pass therethrough.

Compensating filter 25 is prepared by spraying a film of photographic emulsion onto the face of plastic plate 23 in substantially light-free surroundings, such as a dark room. The emulsion is then exposed by the dial lamp which is placed adjacent the edge of the plate in the same position that it will occupy in the instrument. Thereafter, the emulsion is developed to a gamma of approximately unity, fixed and dried. It will be found that the opacity of the developed emulsion on the plate varies proportionately with the brightness value of the light immediately before it passes through the filter. When the dial is placed in its correct position in instrument 11, the area of the filter adjacent lamp 19 will be darker than points remote therefrom so as to present a variable resistance to passage of light rays. In this way, even illumination of plate 23 may be obtained.

After the emulsion has been fixed and dried, a white translucent layer of lacquer 27 is applied onto filter 25. A black mask 29, consisting of either black paint or printer's ink, is then applied to lacquer 27. By leaving portions of translucent lacquer 27 free of black paint or printer's ink, indicia may be formed in a manner well known to those skilled in the art. It will be seen that the light rays from lamp 19 are internally reflected and transmitted through plate 23 and diffused by translucent lacquer 27 whereby the indicia become visible to an observer.

Other methods for forming indicating dial 13 may be employed. For example, the image of one dial plate illuminated by its own lamp may be projected by a lens onto a succession of other dial plates or onto a master film. The master could then be used for direct exposure of other plates or as a basis for some process, like silk screening, for preparation of large quantities.

Figure 3:
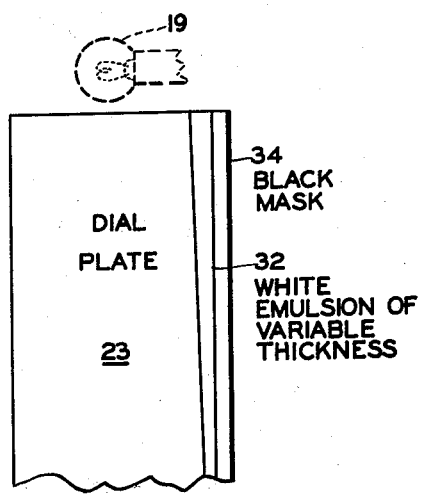
Fig. 3 is a view of a fragmentary portion of an indicating dial, exaggerated for purposes of clarity, and embodying a slightly different form of the present invention.

Fig. 3 illustrates a second embodiment of the invention wherein the white translucent layer of lacquer is eliminated. In this embodiment of the invention, a compensating filter 32 comprising a photographic emulsion of the type used in wash-off relief film is formed on the face of plate 23. Unlike standard photographic emulsions, which react to exposure by exhibiting a variable optical density after processing, the emulsion comprising filter 32 acquires a variable thickness to effect a variable "resistance" to light rays passing through the filter. Filter 32 provides a good background for daylight illumination, and has a variable resistance to transmitted light and so can serve the purpose of background and compensating filter. A black mask 34 comprising either black paint or printer's ink is applied over filter 32. Compensating filter 32, as shown in Fig. 3, has a variable thickness which is greater adjacent the light source 19 than at points remote therefrom.

Filter 32 is prepared in a manner similar to the preparation of filter 25. A photographic emulsion of the type used in wash-off relief film is sprayed onto the face of plastic plate 23 in substantially light-free surroundings, such as a dark room. The emulsion is then exposed by the dial lamp which is placed adjacent the edge of the plate in the same position that it will occupy in the instrument. Thereafter the emulsion is developed to a gamma of approximately unity, fixed and dried. By leaving certain portions of filter 32 free of the black mask, indicia are formed thereon. Thus, when the plate is positioned in the instrument, even illumination thereof is obtained.

In wash-off relief film, the emulsion is dye absorbent. Accordingly, compensating filter 32 can be used as a color filter as well as a compensator where only certain portions of the spectrum are to be transmitted.

The present invention also comtemplates the "back-lighting" method of illuminating dial 13 but is not shown in the drawing in order to avoid an undue number of figures. In the "back-lighting" method, bulb 19 is positioned behind the dial so that light rays from the bulb will travel from the back to the front of the dial. The compensating filters 25 or 32 may be arranged on the front of the dial, as shown in Figs. 2 and 3, or on the back of the dial adjacent the bulbs. In either case, the indicia will be evenly illuminated by light rays passing through the filter.

It will now be apparent that the present invention provides novel means for evenly illuminating a transparent indicating member. By providing a compensating filter which has a variable opacity and offers a "resistance" to light proportional to the brightness thereof, objectional areas of high brilliance are eliminated and even illumination of the indicating member is obtained. It is to be understood that the invention is not limited to plate members but is applicable to any transparent member which is used for indicating members, such as transparent counter wheels, for example.

Although several embodiments of the present invention have been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A device of the type described comprising a transparent member having indicia thereon, a source of illumination positioned and arranged with respect to the member so that light rays are transmitted therethrough to illuminate the indicia, and a compensating filter on said member of variable thickness for varying the brightness values of the rays illuminating the indicia, the opacity of said filter corresponding to the thickness thereof.

2. A device of the type described comprising a transparent member having indicia thereon, a source of illumination positioned and arranged with respect to the member so that light rays are transmitted therethrough to illuminate the indicia, and a developed photographic emulsion on said member of variable thickness but of uniform optical density per unit thickness for presenting a variable resistance to the light rays illuminating the indicia to provide even illumination thereof.

3. A device of the type described comprising a transparent base member, a source of illumination disposed with respect to the base member so that light rays therefrom are transmitted therethrough at an edge of said base member, compensating filter means for said base member of variable optical density as a function of the thickness of said filter means, and a substantially opaque layer having indicia over said compensating filter means.

4. A device of the kind set forth in claim 3, and wherein said compensating filter means also carries a dye of predetermined color to provide a colored area for said indicia.

5. A device of the type set forth comprising a transparent base member, a source of illumination positioned with respect to said transparent member for edge lighting thereof, compensating filter means for said base member and being of variable opacity for controlling the brightness values of light rays transmitted therethrough from said source, said compensating filter means including a coloring means, and indicia bearing means for said device, whereby indicia of a predetermined color is provided of substantially equal light intensity.

References Cited in the file of this patent

UNITED STATES PATENTS

| | | |
|---|---|---|
| 1,722,368 | Comstock | July 30, 1929 |
| 1,953,471 | Eich | Apr. 3, 1934 |
| 2,182,993 | Moreno | Dec. 12, 1939 |
| 2,660,824 | Neugass | Dec. 1, 1953 |
| 2,772,498 | Miles | Dec. 4, 1956 |